United States Patent [19]
Le

[11] Patent Number: 4,658,651
[45] Date of Patent: Apr. 21, 1987

[54] WHEATSTONE BRIDGE-TYPE TRANSDUCERS WITH REDUCED THERMAL SHIFT

[75] Inventor: Da Hong Le, La Verne, Calif.

[73] Assignee: Transamerica DeLaval Inc., Lawrenceville, N.J.

[21] Appl. No.: 732,946

[22] Filed: May 13, 1985

[51] Int. Cl.⁴ .............................................. G01L 9/06
[52] U.S. Cl. ................................ 73/708; 29/610 SG; 73/721; 73/727
[58] Field of Search ................ 73/708, 720, 721, 726, 73/727, 754, DIG. 2; 29/610 SG; 128/675

[56] References Cited

U.S. PATENT DOCUMENTS 4,274,423  6/1981  Mizuno .............................. 128/675
4,373,397  2/1983  Keller ................................... 73/727

Primary Examiner—Donald O. Woodiel
Attorney, Agent, or Firm—Benoit Law Corporation

[57] ABSTRACT

Thermal shift in Wheatstone bridge-type transducers is reduced by providing a diaphragm of semiconductor material accepting formation of strain gages therein having a uniform temperature coefficient of resistance therethrough. That diaphragm is supported in a mechanically floating condition, such as by interposing a cushion of compliant material between the diaphragm and a support which is subject to mechanical strains. An amount of unbalance required for balancing the strain gages on the diaphragm is determined. One of these strain gages is provided with a series balance equal to one-half of that determined amount, while an adjacent one of the strain gages is provided with a shunt balance equivalent to one-half of that determined amount. Alternatively, the strain gages are provided with an initial thermal zero shift offset requiring only a shunt balance for compensation, and thermal zero shift is then compensated only with that shunt balance, or the strain gages are provided with an initial thermal zero shift offset requiring only a series balance of compensation, and that thermal zero shift is then compensated with only that series balance.

22 Claims, 4 Drawing Figures

WHEATSTONE BRIDGE-TYPE TRANSDUCERS WITH REDUCED THERMAL SHIFT

BACKGROUND OF THE INVENTION

1. Field of the Invention

The subject invention relates to transducers, and to methods of making transducers, having a Wheatstone bridge, to methods of reducing thermal shift in Wheatstone bridge-type transducers, to pressure transducers, to methods of making pressure transducers, to methods of reducing thermal shift in pressure transducers, to pressure and other transducers having reduced thermal shift, to disposable pressure and other transducers, and to physiological pressure transducers.

2. Information Disclosure Statement

The following disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments which may be subsequent in time or priority.

Transducers of the type herein considered are devices that convert a physical variable, such as pressure, into a corresponding electric signal. Frequently, strain gages are employed for that purpose on a flexible diaphragm or beam stressed or strained by the physical variable. The strain gages or strain gage resistors are most typically interconnected in a Wheatstone bridge arrangement, but half bridges and other arrangements are also common.

Two well-known factors that affect strain gage performance are thermal zero shift (TZS) and thermal sensitivity shift (TSS), which require compensation in one form or another, usually through trimming or addition of shunt and series resistors to different legs of the bridge or strain gage assembly.

In practice, the requisite balancing and compensation adds at least one further step to the manufacture of transducers of the type here under consideration and sometimes requires further adjustment in the field or in subsequent calibration. In the case of large and expensive transducers, that extra work and procedure arguably could be viewed as a worthwhile investment in optimized performance. However, in the case of disposable transducers, for instance, such an argument becomes tenuous, as time and equipment investment is increasingly hard to justify for a disposable transducer that is used only once.

This, in turn, generates the danger that a transducer which was built as a disposable item will be used more than once. In practice, this easily leads to faulty measurements and worse consequences.

For instance, in the health-care field, there is an increasing concern with rising costs. The temptation is great, therefore, for health-care personnel to use a disposable blood pressure or other transducer repeatedly, if the expense of that transducer militates against disposal thereof after only one use. Since, however, such disposable transducers, in order to keep costs low, are not designed for resterilization and reuse, there is not only a danger of faulty measurements and misleading data, but also of harm to patients through continued use of resterilized equipment that was not designed to be resterilized.

Some relief in the direction of a solution appeared with the development of semiconductor transducer diaphragms or beam, in which strain gages were diffused through appropriate doping of a semiconductor wafer. Since a large number of such diaphragms or beam were thus manufactured on a single wafer and were then dissected therefrom, the individual diaphragms or beams could be made small enough so as to display a fairly uniform temperature coefficient of resistance therethrough. However, existing designs reintroduced the need for thermal shift compensation through imposition of mechanical strains on the semiconductor diaphragm or beam.

Despite mounting of diaphragms with the aid of spaced steel balls and despite a known proposal to mount a Hall effect transducer on a rubber support, no conception of the subject matter hereinafter claimed did, however, become apparent. It is thus a curious fact that efforts to calibrate even disposable semiconductive transducers in the traditional way, or efforts to provide expensive and complex equipment for that purpose, continued prior to, and even after conception of, the subject invention. That, at any rate, would have nullified whatever benefit a mechanically isolated or floating condition would have had on thermal shift.

SUMMARY OF THE INVENTION

It is a general object of this invention to overcome the disadvantages and to meet the needs expressed or implicit in the above Information Disclosure Statement or in other parts hereof.

It is a germane object of the invention to improve the performance of transducers.

It is a related object of the invention to improve the manufacture and decrease the cost of transducers.

It is also an object of this invention to reduce thermal shift in Wheatstone bridge transducers.

It is a related object of this invention to simplify the calibration or compensation of transducers of the Wheatstone bridge-type.

It is also an object of this invention to provide improved disposable transducers at less costs.

It is a related object of this invention to obviate or strongly discourage unauthorized or dangerous reuse of disposable transducers.

It is a germane object of this invention to safeguard patients and others against reuse of disposable transducers and, thereby, against the harm resulting therefrom.

Other objects of the invention will become apparent in the further course of this disclosure.

From one aspect thereof, the subject invention resides in a method of making a transducer of the Wheatstone bridge type, having a housing, and, more specifically, resides in the improvement of reducing thermal shift, comprising in combination the steps of providing a diaphragm of semiconductor material accepting formation of strain gages therein having a uniform temperature coefficient of resistance therethrough, providing in said diaphragm strain gages, while maintaining said uniform temperature coefficient of resistance, providing for said diaphragm a support subject to mechanical strains, providing a cushion of compliant material capable of isolating said diaphragm from said mechanical strains to which said support is subject, interposing said cushion of compliant material between said diaphragm and said support, when supporting said diaphragm in said housing with the aid of said support, while leaving said strain gages exposed to strains imposed by a physical parameter to be measured with said transducer, and providing electric lead wires for said strain-gages with sufficient limpness to prevent transmission of mechanical strains therealong. This aspect of the invention also includes the steps of determining an amount of unbalance required of said strain gages for balancing a zero offset of the strain gages, providing one of said strain gages with a series balance equal to one-half of said determined amount, and completing balancing of said zero offset and also avoiding a thermal zero shift of the Wheatstone bridge by providing an adjacent one of said strain gages with a shunt balance equivalent to one-half of said determined amount.

In this respect, the expression "diaphragm," as herein employed by itself, is intended to be broad enough to cover beams and equivalents thereof as well.

From a related aspect thereof, the subject invention also resides in a method of making a transducer of the Wheatstone bridge type, and, more specifically, resides in the improvement of reducing thermal shift, comprising in combination the steps of providing a diaphragm of semiconductor material accepting formation of strain gages therein having a uniform temperature coefficient of resistance therethrough, providing in said diaphragm strain gages with an initial zero offset and thermal shift requiring only a shunt balance for compensation, and compensating thermal zero shift of said strain gages with only said shunt balance.

From another related aspect thereof, the subject invention also resides in a method of making a transducer of the Wheatstone bridge type, and, more specifically, resides in the improvement of reducing thermal shift, comprising in combination the steps of providing a diaphragm of semiconductor material accepting formation of strain gages therein having a uniform temperature coefficient of resistance therethrough, providing in said diaphragm strain gages with an initial zero offset and thermal shift requiring only a series balance for compensation, and compensating thermal zero shift of said strain gages with only said series balance.

From another related aspect thereof, the subject invention also resides in a method of making a transducer of the Wheatstone bridge type, having a housing, and, more specifically, resides in the improvement of reducing thermal shift, comprising in combination the steps of providing a diaphragm of semiconductor material accepting formation of strain gages therein having a uniform temperature coefficient of resistance therethrough, providing in said diaphragm strain gages and determining an amount of unbalance required for balancing a zero offset of said strain gages, supporting said diaphragm in a mechanically floating condition in said housing, providing one of said strain gages with a series balance equal to one-half of said determined amount, and completing balancing of said zero offset and avoiding also a thermal zero shift of the Wheatstone bridge by providing an adjacent one of said strain gages with a shunt balance equivalent to one-half of said determined amount.

From another related aspect thereof, the subject invention also resides in a transducer of the Wheatstone bridge type, having a housing, and, more specifically, resides in the improvement of reducing thermal shift, comprising, in combination, a diaphragm of semiconductor material having strain gages therein and a uniform temperature coefficient of resistance therethrough, said strain gages requiring a predetermined amount of unbalance for balancing a zero offset of the strain gages, and one of these strain gages having a series balance equal to one-half of said predetermined amount, a support for said diaphragm subject to mechanical strains, means for isolating said diaphragm from said mechanical strains to which said support is subject, including a cushion of compliant material between said diaphragm and said support for supporting said diaphragm in said housing, while leaving said strain gages exposed to strains imposed by a physical parameter to be measured, and electric lead wires of said strain gages having sufficient limpness to prevent transmission of mechanical strains therealong and means for completing balancing of said zero offset while also avoiding a thermal zero shift of the Wheatstone bridge, including a shunt balance equivalent to one-half of said predetermined amount, in an adjacent one of said strain gages.

From another related aspect thereof, the subject invention also resides in a transducer of the Wheatstone bridge type, and, more specifically, resides in the improvement or reducing thermal shift, comprising, in combination, a diaphragm of semiconductor material having strain gages therein and a uniform temperature coefficient of resistance therethrough, said strain gages having an initial zero offset and thermal zero shift requiring only a shunt balance for compensation, and means for compensation zero offset and thermal zero shift of said strain gages including only said shunt balance.

From another related aspect thereof, the subject invention also resides in a Wheatstone bridge-type transducer, and, more specifically, resides in the improvement of reducing thermal shift, comprising, in combination, a diaphragm of semiconductor material having strain gages therein and a uniform temperature coefficient of resistance therethrough, said strain gages having an initial zero offset and thermal zero shift requiring only a series balance for compensation, and means for compensating zero offset and thermal zero shift of said strain gages including only said series balance.

From another related aspect thereof, the subject invention also resides in a Wheatstone bridge-type transducer having a housing, and, more specifically, resides in the improvement of reducing thermal shift, comprising, in combination, a diaphragm of semiconductor material having strain gages therein and a uniform temperature coefficient of resistance therethrough, said strain gages requiring a predetermined amount of unbalance for compensation of an initial zero offset and thermal zero shift, means for supporting said diaphragm in a mechanically floating condition in said housing, a series balance equal to one-half of said predetermined amount for one of said strain gages, and a shunt balance equivalent to one-half of said predetermined amount connected to an adjacent one of said strain gages.

Further aspects of the invention include transducers of a Wheatstone bridge type having a thermal shift reduced by any of the methods of the subject invention.

Other aspects of the invention will become apparent in the further course of this disclosure, and no restriction to any object, aspect or feature is intended by this Summary of the Invention.

BRIEF DESCRIPTION OF THE DRAWINGS

The subject invention and its various objects and aspects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
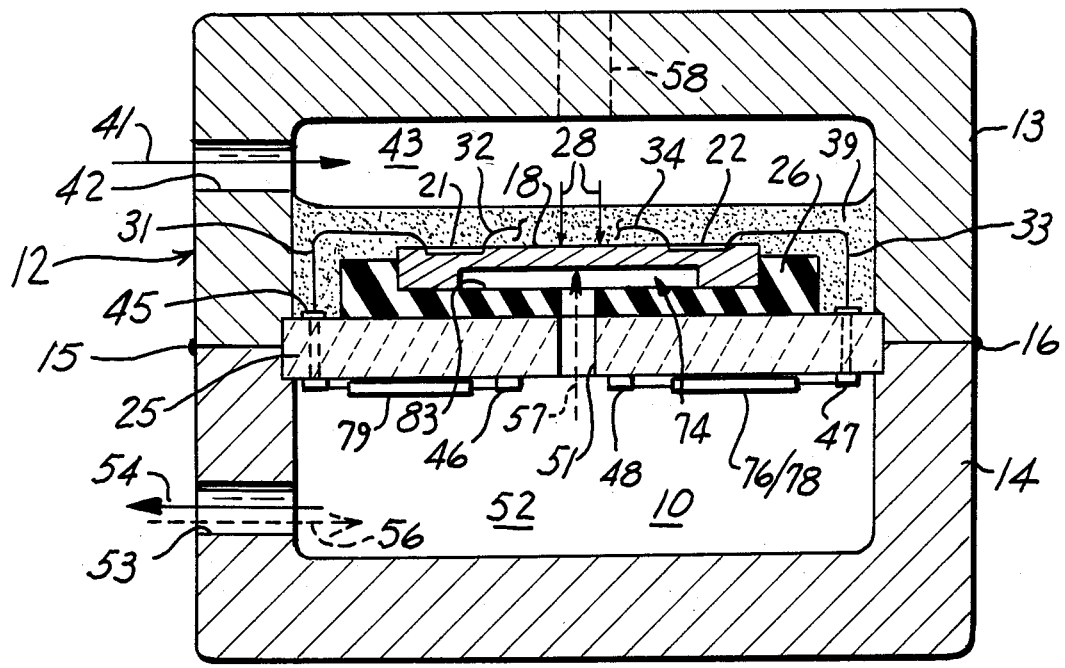
FIG. 1 is a section through a disposable type of transducer according to a preferred embodiment of the subject invention.

The disposable type of pressure transducer 10 shown in FIG. 1 has a housing 12 composed, for instance, of shells or housing parts 13 and 14 which, for example, may be welded together at 15 and 16, or otherwise interconnected.

The illustrated preferred embodiment of the subject invention provides a diaphragm of semiconductor material accepting formation of strain gages therein, such as shown at 21 and 22 in FIG. 1, having a uniform temperature coefficient of resistance therethrough. As more fully disclosed below in connection with FIG. 2, strain gages are provided in the diaphragm 18 while maintaining a uniform temperature coefficient of resistance therethrough.

The illustrated preferred embodiment of the invention further provides a general support 25 for the diaphragm 18, electrical terminals and other components more fully described below. In a prototype of the disposable transducer shown in FIG. 1, the support 25 is an alumina substrate or board. In order to keep thermal shift down and otherwise increase stability, the designer should strive to minimize mechanical strains which could be imposed by the general support 25 on the diaphragm 18. However, it appears inevitable that any supporting board 25 or other support of some rigidity will be subject to some mechanical strains that could affect the operation or call for increased compensation of the strain gages 21, 22, etc., if the diaphragm 18 or its edge region were attached to the general support 25.

However, the preferred embodiment of the subject invention illustrated in FIG. 1 provides a cushion of compliant material 26 capable of isolating the diaphragm from the mechanical strains to which the general support 25 is subject during operation of the transducer 10.

By way of example, the cushion 26 is made of silicone rubber, or another natural or synthetic elastomer, having the requisite compliance sufficient to isolate the diaphragm from the mechanical strains emanating through or from the support 25. According to a preferred embodiment of the subject invention, the diaphragm 18 is supported in a mechanically floating condition in the housing 12, such as by means of the compliant cushion 26 or other medium which may give some support to the diaphragm, without transmitting mechanical strains thereto.

In the embodiment shown in FIG. 1, the cushion of compliant material 26 is interposed between the diaphragm 18 and the general support 25, when supporting that diaphragm in the housing 12 with the aid of that general support, while leaving the strain gages 21, 22, etc. exposed to strains imposed by pressure or pressure gradients 28.

Figure 3:
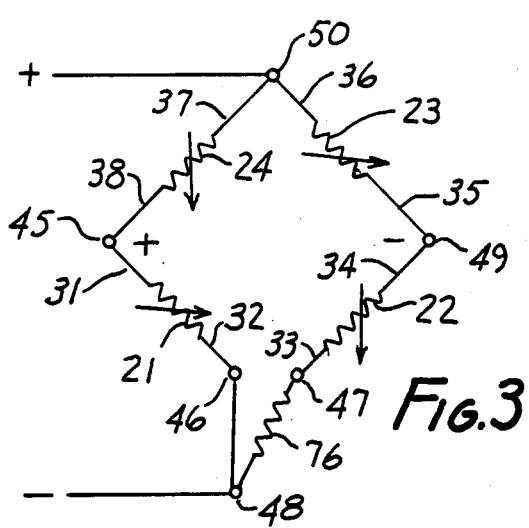
FIG. 3 is a circuit diagram illustrating a compensation method for the transducer of FIG. 1.

Electric lead wires 31, 32, 33, 34, 35, 36, 37 and 38, for strain gages or strain gage resistors 21, 22, 23 and 24, shown in FIG. 3 and partially also in FIG. 1, are provided with sufficient limpness to prevent transmission of mechanical strains therealong.

If material having a certain stiffness is employed for the wires 31 to 38, then such wires are made sufficiently thin so as to be, in effect, too limp for a transmission of mechanical strains therealong that could influence the operation of the strain gages.

In the preferred embodiment shown in FIG. 1, the diaphragm 18 and strain gages 21, 22, etc., are covered with a silicone gel or another electrically insulating gel 39.

A gel is sometimes defined as "a jellylike substance formed by the coagulation of a colloidal solution into a solid phase." The important point in this respect, however, is that the gel 39 will permit transmission of mechanical strains or pressure gradients 28 to the diaphragm 18, while the compliant material of the cushion 26 will not permit transmission of significant mechanical strains to the diaphragm 18. Accordingly, the diaphragm and thereby the strain gages 21, 22, etc., will be exposed to pressure gradients 28 and to the strains imposed thereon by the pressure or other physical variable 41 applied to the disposable transducer 18 through an inlet port 42.

Figure 4:
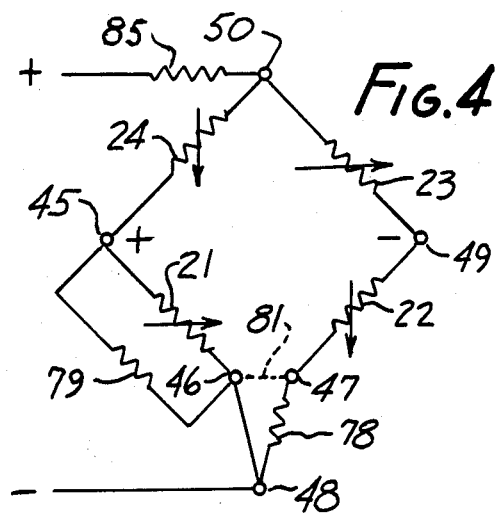
FIG. 4 is a circuit diagram illustrating a compensation method for the transducer of FIG. 1 or otherwise according to a further embodiment of the subject invention.

Accordingly, if the variable 41 is imposed via an electrically conducting liquid applied to transducer chamber 43, the gel 39 electrically insulates that liquid from the wires 31 to 38, strain gages 21 to 24 and terminals 45, 46, 47, 48, 49 and 50 shown in FIGS. 3 and 4 and partially also in FIG. 1.

The gel 39, in turn, may also isolate the diaphragm 18, strain gages, electrical wires, terminals and cushion 26 from certain harmful influences, such as corrosiveness of pressurized fluids admitted through port 42 to the transducer chamber 43, or corrosive environments to which the transducer may be subjected.

The gel 39 and the cushion of compliant material 26 thus differentiate in practice between strains or gradients 28 imposed by the fluid or variable 41 for imposition on the diaphragm 18 and its strain gages on one hand and mechanical strains originating with the support 25 or being otherwise kept away from diaphragm 18 and strain gages 21 to 24 on the other hand.

Pressure may, for instance, be relieved from the underside of the diaphragm 18 through a common aperture 51 in the general support 25 and cushion 26. In this respect, a second chamber 52 and a second port 53 may be provided in the lower part of the disposable transducer 10. A pressure gradient or fluid 54 may be permitted to escape the transducer through the second port 53. Alternatively, a second variable 56 and gradient 57 may be admitted to the lower side of the diaphragm 18 through port 53, lower chamber 52 and common aperture 51. In that case, the transducer 10 may operate, for instance, as a differential pressure transducer via ports 42 and 53.

One or more further ports, such as indicated at 58 in FIG. 1, may be provided through the transducer housing 12, such as for the purpose of permitting air bubbles or other contaminants to escape from the transducer 10, or for the purpose of permitting the fluid or variable 41 to flow continuously or continually through the transducer chamber 43.

Figure 2:
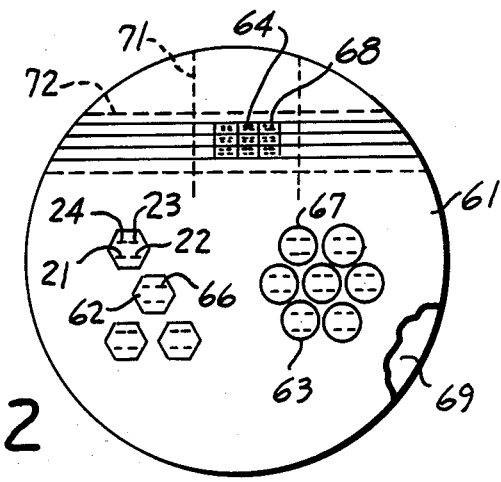
FIG. 2 is a top view of a semiconductor wafer having diffused silicon strain gages thereon, for use in the transducer of FIG. 1.

As shown in FIG. 2, illustrating a phase or component of an embodiment of the subject invention, a wafer of semiconductor material 61 is provided.

That wafer may be circular as illustrated, or may be square or have any other desired and feasible configuration. Suitable semiconductor materials for the wafer 61 or strain gages 21 to 24 include silicon, gallium arsenide, gallium phosphide, and germanium.

Conventional or novel photolithographic, masking and other processes may be employed for forming multitudes of sets of strain gages 21 to 24 on the wafer 61.

According to a feature of the combination representing an aspect of the subject invention, each set 62, 63 or 64 of strain gages 21 to 24 is confined to a region 66, 67 or 68 of the wafer 61 having a uniform temperature coefficient of resistance therethrough. In other words, where the temperature coefficient of resistance varies across or over the wafer 61, the currently discussed feature determines a region 66, 67 or 68 of the wafer having a uniform temperature coefficient of resistance throughout that particular region, and then provides any set 62, 63 or 64 of strain gages 21 to 24 only in such a region of uniform temperature coefficient.

By way of example, the sets of strain gages 21 to 24 may be diffused into each of the regions 66, 67 or 68 by applying a well-known selective doping or diffusion technique to the wafer 61. Alternatively, a thin film technique may be employed for providing the desired multitude of strain gages 21 to 24 on the wafer 61. Also, the wafer 61 may consist of semiconductor material or may have such material deposited on a metallic or other substrate 69 by chemical deposition, sputtering, vapor deposition or another method.

The regions 66, 67 or 68 are dissected from the wafer 61 to provide the above mentioned diaphragm 18 having the requisite uniform temperature coefficient of resistance therethrough. Etching or cutting techniques may be employed for this purpose, or the wafer may be broken along crystal axes in the dissection process.

As indicated by dotted lines 71 and 72 in FIG. 2, square or rectangular regions 68 may be dissected from the wafer 61. In that case, the diaphragm 18, within the connotation of that expression as herein employed, may in fact be in the form of a beam.

Alternatively, the dissection of the wafer 61 may proceed at angles and in stages so as to provide hexagonal diaphragms 66. Circular diaphragms may, of course, also be provided from the wafer 61, as illustrated at 67 in FIG. 2.

The underside of the wafer may be edged or, especially in the case of a metallic substrate, punched or otherwise deformed to provide each diaphragm with a cavity 74 inside a thicker circumferential region, as seen in FIG. 1. Because of their resulting small size, the strain gages 21 to 24 are only indicated very diagrammatically in FIG. 2, and it is to be understood that any desired optimum strain gage position, configuration and orientation may be employed in the practice of the subject invention.

In accordance with a related aspect of the subject invention, inexpensive disposable transducers can be manufactured by providing the strain gages 21 to 24 with an initial zero offset and thermal zero shift requiring only a series balance for compensation, as indicated at 76 in FIG. 3.

In production, the initial zero offset and thermal zero shift can be made positive or negative or otherwise predetermined when the gage pattern is designed and manufactured so that either only a series balance or only a shunt balance is required for the desired thermal zero shift (TZS) compensation.

For instance, each gage pattern or set 62, 63 or 64 may be designed to have a positive zero offset and a negative TZS through manufacturing techniques known per se, making the compression gages more sensitive to temperature changes than the tension gages. The currently discussed feature of the invention then connects a compensation resistor 76 in series with one of the compression gages 22. The single series compensation resistor 76 thus simultaneously balances the zero offset and corrects the TZS slope of the entire bridge. Similarly, the zero offset and TZS slope of the bridge may be balanced by a single resistor 76 in series with the tension gage, if the zero offset is made negative and the TZS positive.

Alternatively, it is possible according to an aspect of the subject invention to provide the strain gages 21 and 24 with an initial thermal zero shift offset requiring only a shunt balance for compensation. For instance, the above mentioned design and manufacturing techniques may be employed for providing a positive zero offset and a positive TZS, in which case the zero offset and TZS slope of the bridge may be balanced by a single shunt resistor 79 in parallel to the tension gage 21. Similary, the zero offset and TZS slope of the bridge may be corrected by a single shunt resistor 79 in parallel to the compression gage, if both the zero offset and the TZS are made negative.

Since FIG. 4 is employed to illustrate two different, though related, features, it also shows a series resistor 78. However, in the currently discussed aspect of the invention, requiring only a shunt balance at 79, the series resistor 78 is deleted or effectively shunted, as indicated by the dotted line 81 in FIG. 4

Accordingly, only a temperature stable shunt resistor 79 is then employed for balancing the entire bridge. In practice, this has the great advantage that the bridge may be closed internally on the diaphragm 18, requiring only four pins or terminals throughout the sensor and its connection to the bridge energization and output cable (not shown). In that case, terminals 46, 47 and 48 shown in FIG. 4 may be unified into a single terminal or pin, so that there are only four input and output terminals, counting that unified terminal and the three remaining terminals 45, 49 and 50.

If the initial zero offset and thermal shift are either both positive or both negative, then zero offset and thermal zero shift may be balanced or compensated with only a shunt balance, such as the parallel resistor 79, without the series resistor 78. If, on the other hand, one of such initial zero offset and thermal zero shift are made positive, while the other of that initial zero offset and thermal zero shift are made negative, then the single series balance 76 may be employed for compensation of the entire bridge. In that case, the initial zero offset is either positive or negative, while the corresponding thermal shift is then negative or positive, respectively.

The latter aspect of the invention, concerning balancing by a series resistor only or, alternatively, by a shunt resistor only, may be practised without support of the diaphragm in a mechanically floating condition. On the other hand, for higher quality requirements and increased sophistication in transducer design, the diaphragm 18 may be supported in a mechanically floating condition in housing 13 or in another enclosure, when practising the balancing technique described below with the aid of FIG. 4.

In principle, the diaphragm 18 may be suspended on one or more of the strain gage lead wires 31 to 38 which, however, even then are provided with sufficient limpness to avoid transmission of strains from any general support 25 to the strain gages and diaphragm.

Where suspension of the diaphragm and strain gages on their lead wires would not provide a sufficiently rugged and durable unit, it is, however, preferable to employ the above mentioned cushion of compliant material 26 for isolating the diaphragm from mechanical strains to which the general support 25 is subject. For instance, a cushion of compliant material 26, having a cavity 83 conforming in shape to the circular, rectangular, hexagonal or other overall configuration of the diaphragm 18, may be bonded or otherwise attached at its lower surface to the ceramic or other compensation board or support 25, so as to provide a very sensitive and easily compensated, but rather rugged transducer unit, which, for electrical insulation and increased ruggedness and integrity, may further be potted in the gel 39 or other pressure-gradient-transmissive and electrically insulating substance.

In accordance with a further aspect of the invention, greater design latitude, higher production yield and better performance may be attained by effecting compensation with a shunt balance and a series balance as illustrated in solid outline at 78 and 79 in FIG. 4, and in the following manner: First, an amount of unbalance required for compensation of zero offset of the bridge 21 to 24 is determined. For instance, that amount of unbalance may be symbolized by the resistor shown at 76 in FIG. 3 for an equivalent series compensation. However, according to the currently discussed aspect of the invention, one of the strain gages, such as the strain gage resistor 22, is then provided with a series balance, as indicated by the series resistor 78 in FIG. 4, equal in amount to one-half of the determined required unbalance. Compensation of the zero offset of the bridge is then completed as indicated at 79 in FIG. 4, by providing an adjacent one of the strain gages, such as the strain gage resistor 21, with a shunt balance equivalent to one-half of the above mentioned determined amount of unbalance that would be required for compensation of zero offset of the bridge or strain gauge without presence of the shunt balance 79.

As an important point of this aspect of the invention, the latter method at the same time avoids a thermal zero shift that would be introduced by a conventional balancing technique. The compensation techniques according to the currently discussed aspect of the invention are thus advantageously combined with the diaphragm cushioning feature of FIG. 1 or with another support of the diaphragm in a mechanically floating condition. The techniques for assuring uniform temperature coefficient of resistance throughout the diaphragm or strain gages are also advantageously combined with the latter features.

The currently discussed aspect of the invention unexpectedly avoids hours of testing and thermal calibration in a thermal chamber needed with conventional methods, since it turns out that balancing as just disclosed at the same time compensates also for thermal zero shift. Thermal sensitivity shift may be compensated by providing the bridge with a higher sensitivity than as required, and by inserting a resistor 85 in series with the bridge for reducing bridge sensitivity to the design level.

A practical value for the series balance, $R_s$, that is, of the resistance of the series resistor 78 shown in FIG. 4 is:

$$R_s = \frac{R_3 R_1 - R_4 R_2}{2 R_4} \quad (1)$$

wherein:
$R_1$ = resistance of strain gage 23,
$R_2$ = resistance of strain gage 22,
$R_3$ = resistance of strain gage 21, and
$R_4$ = resistance of strain gage 24.

In terms of the latter strain gage resistances, a practical value for the shunt balance, $R_p$; that is, of the resistance of the parallel resistor 79 shown in FIG. 4 is:

$$R_p = R_3 \frac{R_1 R_3 + R_2 R_4}{R_1 R_3 - R_2 R_4} \quad (2)$$

which is the above mentioned shunt balance equivalent to one-half of the determined amount of unbalance.

The value of the shunt balance may also be determined in terms of the series balance, $R_s$, as, $$R_p = \frac{R_3 R_4 (R_2 + R_s)}{R_1 R_3 - R_4 (R_2 + R_s)} \quad (3)$$

wherein $R_s$, as stated initially, is equal in amount to one-half of the unbalance required for balancing the bridge without the shunt resistor; as indicated at 76 in FIG. 3.

The subject invention is particularly suited for use with the autocalibrator disclosed in the commonly assigned patent application Ser. No. 06/581,481, filed Feb. 17, 1984, by Ronald Bowman, for Disposable Transducer Systems, and herewith incorporated by reference herein. By way of example, the series resistance 76 in the embodiment of FIG. 3, or the series resistance 78 and shunt resistance 79 in the embodiment of FIG. 4 hereof, may be provided by the type of autocalibrator disclosed in the latter commonly assigned patent. In that case, the compensation resistors 76 and 78/79 may be deleted from the embodiment shown in FIG. 1 hereof.

As in the latter commonly assigned patent, a machine-readable record or code of the parameters required for compensation or calibration of the disposable transducer may be provided on the housing 12 of the embodiment shown in FIG. 1, or on a housing (not shown) of another disposable transducer within the purview of the embodiments of FIGS. 3 and 4 hereof. The code for any such disposable transducer may then be read, such as via the fiber optics cable 19 and autocalibrator or interfacing apparatus 14 shown in the latter commonly assigned patent application. That interfacing apparatus thereupon provides the needed calibration or compensation resistance values 76, 79 or 78 and 79, respectively, for the calibration and operation of the particular disposable transducer.

Anti-resterilization methods and devices of the type disclosed in the latter commonly assigned patent application or resulting patent may also be employed with disposable transducers according to the subject invention, in order to discourage or inhibit detrimental resterilization thereof.

Transducers according to the subject invention are well suited for blood pressure measurements and other physiological purposes. For instance, transducers according to the subject invention may be employed in the system of my commonly assigned U.S. Pat. No. 4,505,157, issued Mar. 19, 1985, for Transducers with Quick Dome Connect Systems, hereby incorporated by reference herein.

Alternatively, transducers according to the subject invention may be employed in the seeping flow rate/fast flushing devices of my commonly assigned copending patent application Ser. No. 06/483,207, filed Apr. 13, 1983, for Catheter Flushing Systems, and hereby incorporated by reference herein. A transducer as shown in FIG. 1, or a transducer pursuant to FIGS. 3 and 4, may, for instance, be employed as integral transducer 175 in the embodiment of FIG. 7 or equivalents thereof disclosed in my latter commonly assigned patent application.

It should be understood that transducers according to the subject invention also have utility in many industrial and other fields and applications.

While application to pressure transducers has been emphasized herein, it is to be understood that the utility of the subject invention is not limited to pressure transducers, but extends to temperature, force, accelerometer and other transducers employing a Wheatstone bridge, herein sometimes referred to as "Wheatstone bridge-type transducer." This terminology is intended to be broad enough to cover not only full bridges in which all of the bridge legs have at least one strain gage or strain-sensitive resistor 21, 22, 23 or 24 located therein, but also, for example, half bridges in which strain gages or strain gage resistors are located in only two legs of the bridge.

If physical parameters other than pressure, or variables other than those expressed by strain are to be measured by the transducer, then the strain gages 21, 22, etc. are replaced by temperature-sensitive resistors, in the case of a temperature measurement transducer, or other sensitive devices capable of sensing gradients of variables to which the transducer is to be sensitive.

The subject extensive disclosure will suggest or render apparent to those skilled in the art various modifications and variations within the spirit and scope of the subject invention and of equivalents thereof.

I claim:

1. In a method of making a Wheatstone bridge-type transducer having a housing, the improvement of reducing thermal shift, comprising in combination the steps of:
providing a diaphragm of semiconductor material accepting formation of strain gages therein having a uniform temperature coefficient of resistance therethrough;
providing in said diaphragm strain gages, while maintaining said uniform temperature coefficient of resistance;
providing for said diaphragm a support subject to mechanical strains;
providing a cushion of compliant material capable of isolating said diaphragm from said mechanical strains to which said support is subject;
interposing said cushion of compliant material between said diaphragm and said support, when supporting said diaphragm in said housing with the aid of said support, while leaving said strain gages exposed to strains imposed by a physical parameter to be measured with said transducer;
providing electric lead wires for said strain gages with sufficient limpness to prevent transmission of mechanical strains therealong;
determining an amount of unbalance required of said strain gages for balancing a zero offset of said strain gages;
providing one of said strain gages with a series balance equal to one-half of said determined amount; and
completing balancing of said zero offset and also avoiding a thermal zero shift of the Wheatstone bridge by providing an adjacent one of said strain gages with a shunt balance equivalent to one-half of said determined amount.

2. A method as claimed in claim 1, including the steps of:
providing a wafer of said semiconductor material;
determining a region in said wafer having a uniform temperature coefficient of resistance therethrough; and
dissecting said region from said wafer to provide said diaphragm having said uniform temperature coefficient therethrough.

3. A method as claimed in claim 1, wherein:
said cushion is made of an elastomer having a compliance sufficient to isolate said diaphragm from said mechanical strains.

4. A method as claimed in claim 1, wherein:
said cushion is made of a silicone rubber having a compliance sufficient to isolate said diaphragm from said mechanical strains.

5. A method as claimed in claim 1, including the step of:
covering said diaphragm and strain gages with electrically insulating gel.

6. A method as claimed in claim 5, wherein:
a silicone gel is selected as said gel covering said diaphragm and strain gages.

7. A method as claimed in claim 5, including the step of:
providing said cushion with a cavity conforming in shape to an overall configuration of said diaphragm.

8. In a method of making a Wheatstone bridge-type transducer having a housing, the improvement of reducing thermal shift, comprising in combination the steps of:
providing a diaphragm of semiconductor material accepting formation of strain gages therein having a uniform temperature coefficient of resistance therethrough;
providing in said diaphragm strain gages with an initial zero offset and thermal zero shift requiring only a shunt balance for compensation; and
compensating zero offset and thermal zero shift of said strain gages with only said shunt balance.

9. A method as claimed in claim 8, including the step of:
making both said initial zero offset and thermal zero shift positive.

10. A method as claimed in claim 8, including the step of:

making both said initial zero offset and thermal zero shift negative.

11. In a method of making a Wheatstone bridge-type transducer having a housing, the improvement of reducing thermal shift, comprising in combination the steps of:

providing a diaphragm of semiconductor material accepting formation of strain gages therein having a uniform temperature coefficient of resistance therethrough;

providing in said diaphragm strain gages with an initial zero offset and thermal zero shift requiring only a series balance for compensation; and compensating thermal zero shift of said strain gages with only said series balance.

12. A method as claimed in claim 11, including the steps of:

making one of said initial zero offset and thermal zero shift positive; and making the other of said initial zero offset and thermal zero shift negative.

13. In a Wheatstone bridge type transducer having a housing, the improvement of reducing thermal shift, comprising in combination:

a diaphragm of semiconductor material having strain gages therein and a uniform temperature coefficient of resistance therethrough, said strain gages requiring a predetermined amount of unbalance for balancing a zero offset of said strain gages, and one of said strain gages having a series balance equal to one-half of said predetermined amount;

a support for said diaphragm, subject to mechanical strains;

means for isolating said diaphragm from said mechanical strains to which said support is subject, including a cushion of compliant material between said diaphragm and said support for supporting said diaphragm in said housing, while leaving said strain gages exposed to strains imposed by a physical parameter to be measured with said transducer;

electric lead wires for said strain gages having sufficient limpness to prevent transmission of mechanical strains therealong; and means for completing balancing of said zero offset while also avoiding a thermal zero shift of the Wheatstone bridge, including a shunt balance equivalent to one-half of said predetermined amount, in an adjacent one of said strain gages.

14. A transducer as claimed in claim 13, including:

electrically insulating gel covering said diaphragm and strain gages in said housing.

15. A transducer as claimed in claim 13, wherein:

said cushion comprises an elastomer having a compliance sufficient to isolate said diaphragm from said mechanical strains.

16. A transducer as claimed in claim 13, wherein:

said cushion comprises a silicone rubber having a compliance sufficient to isolate said diaphragm from said mechanical strains.

17. A transducer as claimed in claim 14, wherein:

said gel is a silicon gel covering said diaphragm and strain gages.

18. A transducer as claimed in claim 14, wherein:

said cushion has a cavity conforming in shape to an overall configuration of said diaphragm.

19. In a method of making a Wheatstone bridge-type transducer having a housing, the improvement of reducing thermal shift, comprising in combination the steps of:

providing a diaphragm of semiconductor material accepting formation of strain gages therein having a uniform temperature coefficient of resistance therethrough;

providing in said diaphragm strain gages and determining an amount of unbalance required for balancing a zero offset of said strain gages;

supporting said diaphragm in a mechanically floating condition in said housing;

providing one of said strain gages with a series balance equal to one-half of said determined amount; and completing balancing of said zero offset and avoiding also a thermal zero shift of said bridge by providing an adjacent one of said strain gages with a shunt balance equivalent to one-half of said determined amount.

20. In a Wheatstone bridge-type transducer, the improvement of reducing thermal shift, comprising in combination:

a diaphragm of semiconductor material having strain gages therein and a uniform temperature coefficent of resistance therethrough, said strain gages having an initial zero offset and thermal zero shift requiring only a shunt balance for compensation; and means for compensating zero offset and thermal zero shift of said strain gages including only said shunt balance.

21. In a Wheatstone bridge-type transducer, the improvement of reducing thermal shift, comprising in combination:

a diaphragm of semiconductor material having strain gages therein and a uniform temperature coefficient of resistance therethrough, said strain gages having an initial zero offset and thermal zero shift requiring only a series balance for compensation; and means for compensating zero offset and thermal zero shift of said strain gages including only said series balance.

22. In a Wheatstone bridge-type transducer having a housing, the improvement of reducing thermal shift, comprising in combination:

a diaphragm of semiconductor material having strain gages therein and a uniform temperature coefficient of resistance therethrough, said strain gages requiring a predetermined amount of unbalance for balancing a zero offset of said strain gages;

means for supporting said diaphragm in a mechanically floating condition in said housing;

a series balance equal to one-half of said predetermined amount for one of said strain gages; and means for completing balancing of said zero offset while also avoiding a thermal zero shift of the Wheatstone bridge, including a shunt balance equivalent to one-half of said predetermined amount connected to an adjacent one of said strain gages.

* * * * *